Sept. 8, 1964  T. B. KELEHER  3,147,819
SEAT BELT CONTROL FOR IGNITION SYSTEM
Filed June 13, 1963  2 Sheets-Sheet 1

Timothy B. Keleher
INVENTOR.

BY *Clarence A. O'Brien*
*and Harvey B. Jacobson*
Attorneys

Timothy B. Keleher
INVENTOR.

United States Patent Office 3,147,819
Patented Sept. 8, 1964

3,147,819
SEAT BELT CONTROL FOR IGNITION SYSTEM
Timothy B. Kelcher, First National Bank Bldg.,
Albuquerque, N. Mex.
Filed June 13, 1963, Ser. No. 287,657
3 Claims. (Cl. 180—82)

This invention relates to a novel and useful seat belt control for ignition systems and more specifically to a seat belt assembly constructed in a manner whereby close proximity of the free ends of a seat belt to each other, such as when the free ends are releasably secured together, will be sufficient to actuate a switch in order to close the latter.

The seat belt control of the instant invention is constructed in a manner whereby the switch thereof may be serially connected in an ignition circuit or serially connected in the starting actuator circuit for the electric starter of the internal combustion engine by which the vehicle is powered.

The main object of this invention is to provide a seat belt control constructed in a manner whereby the engine of the vehicle in which the seat belt is disposed may not be started until such time as the free ends of the seat belt sections are secured together in the conventional manner.

Another object of this invention is to provide a seat belt control including an on-off switch carried by the free end of one seat belt section and capable of being actuated magnetically upon being moved into a position closely adjacent a magnet, which magnet is to be carried by the free end of the other seat belt section.

Still another object of this invention is to provide a seat belt control in accordance with the preceding objects constructed in a manner whereby the make and break contacts of the actuating switch of the control are completely enclosed and hidden from view.

A final object of this invention to be specifically enumerated herein is to provide a seat belt control for vehicle ignition systems constructed in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
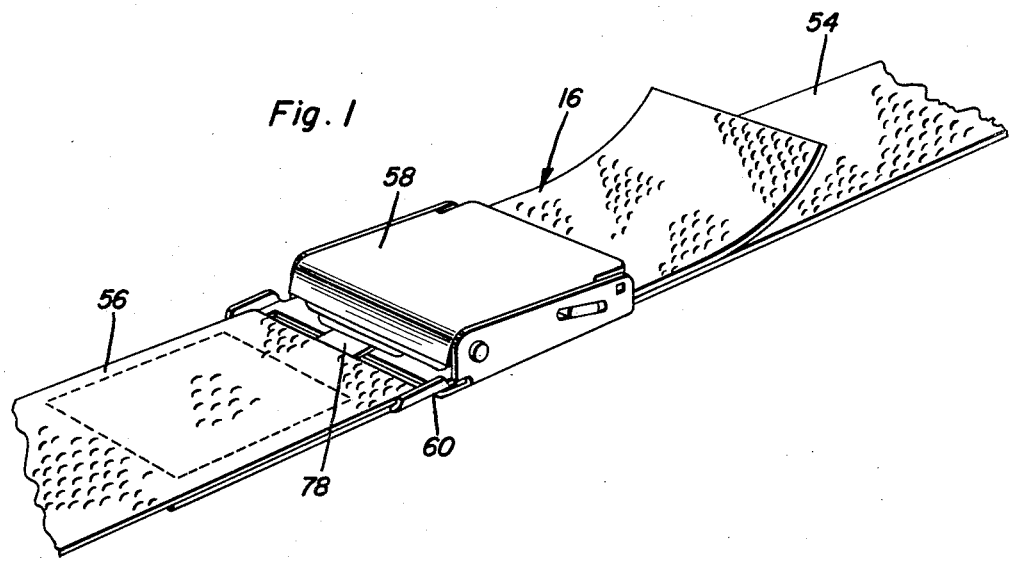
FIGURE 1 is a perspective view of the free ends of a pair of interconnected seat belt sections constructed in accordance with the present invention.
Figure 2:
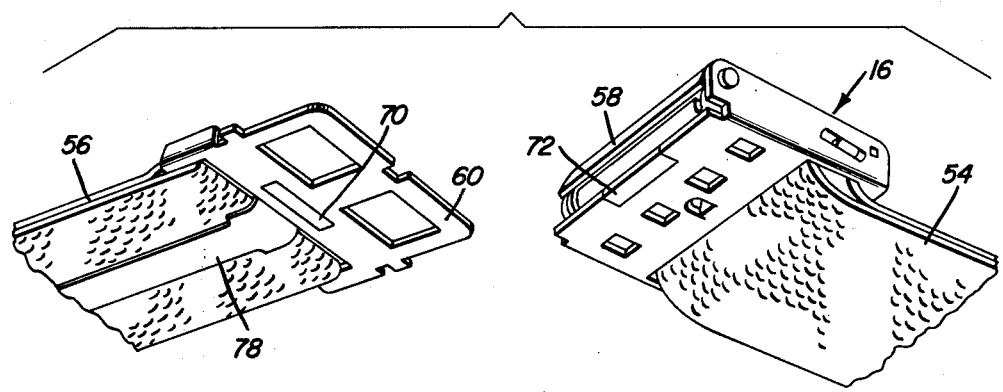
FIGURE 2 is a further perspective view of the free ends of the seat belt sections but shown spaced from each other.
Figure 3:
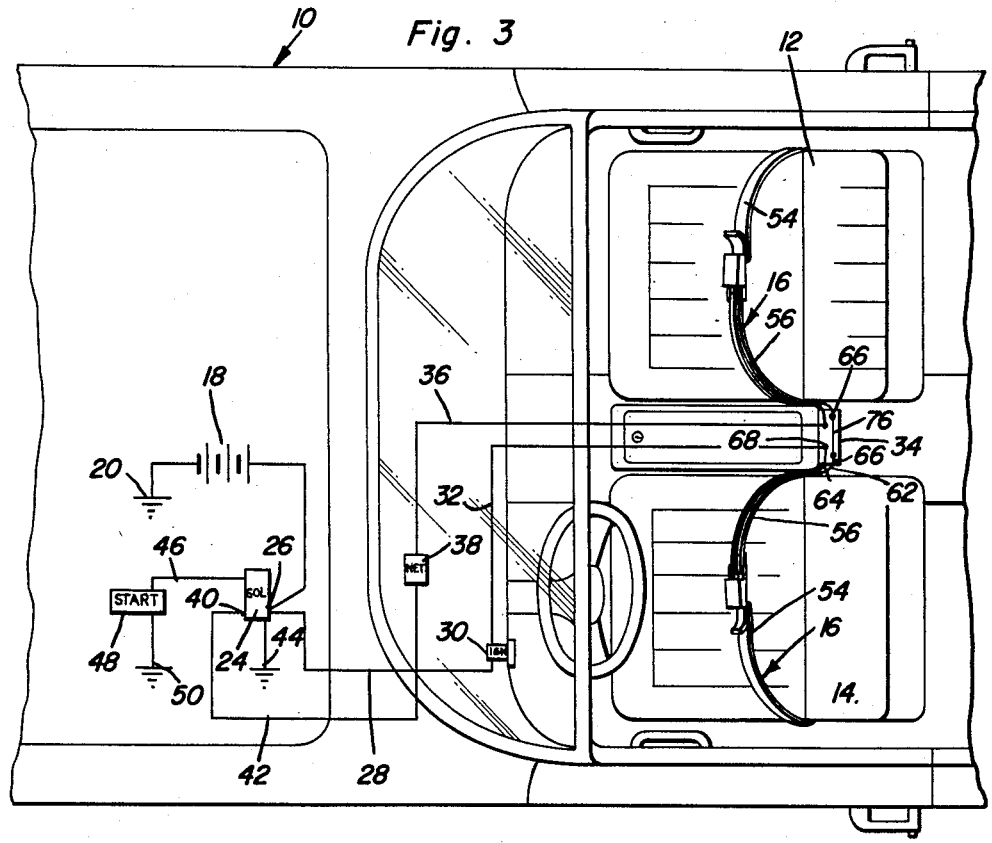
FIGURE 3 is a fragmentary top plan view of a conventional form of passenger vehicle with the wiring circuit of the seat belt control shown diagrammatically.
Figure 4:
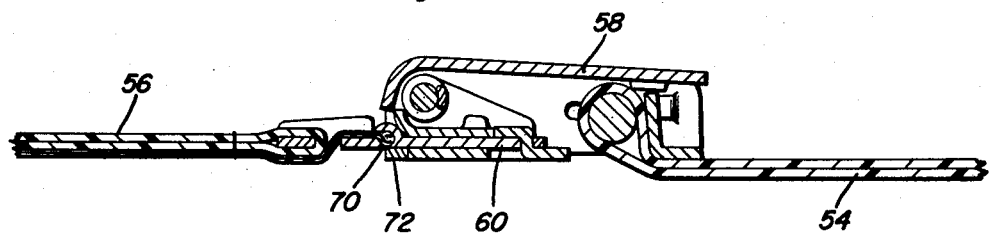
FIGURE 4 is a fragmentary longitudinal sectional view taken substantially upon a plane passing along the longitudinal centerline of the releasably interconnected seat belt free end portions.

Referring now more specifically to the drawings and to FIGURE 3 in particular, the numeral 10 generally designates a conventional form of passenger vehicle which includes a pair of front seats 12 and 14.

Each of the seats 12 and 14 is provided with a seat belt assembly generally referred to by the reference numeral 16 and constructed in accordance with the instant invention. The vehicle 10 includes a battery 18 which is grounded as at 20 and is electrically connected to the starter solenoid 24 as at 26. A conductor 28 extends from the terminal 26 on the solenoid 24 to the ignition switch 30 and a conductor 32 extends from the ignition switch 30 to a junction box 34. The conductor 36 then electrically connects the junction box 34 to the gear shift control neutral switch 38 and the neutral switch 38 is electrically connected to the solenoid at 40 by means of a conductor 42.

The solenoid 24 is grounded as at 44 and a heavy capacity conductor 46 electrically connects the solenoid 44 with the starter 48, the latter of which is grounded as at 50. In normal operation, the ends of the conductors 32 and 36 remote from the ignition switch 30 and the neutral switch 38 would be directly electrically connected. Then, if the gear shift (not shown) of the vehicle 10 were in the neutral position, the ignition switch 30 could be utilized to close the circuit with the solenoid 24 which would then be actuated to close the circuit to the starter 48 whereupon the internal combustion engine (not shown) of the vehicle 10 would then be started.

However, the seat belt control 16 of the instant invention is designed to prevent the solenoid 24 from being electrically actuated unless the seat belts of the vehicle 10 have their free ends properly engaged with each other.

The seat belt control of the instant invention includes a pair of seat belt sections 54 and 56 and it is to be noted that one pair of base ends of the sections 54 and 56 are fixedly secured to the vehicle 10 in any convenient manner. However, the free ends of the belt sections 54 and 56 are provided with a conventional buckle 58 and a belt end member 60, respectively, with which the belt sections may be releasably secured together. The belt sections 56 each have a pair of conductors 62 and 64 secured thereto in any convenient manner and one pair of ends of these conductors 62 and 64 are connected to the terminals 66 and 68, respectively. The ends of the conductors 62 and 64 adjacent the belt end member 60 have a miniature magnetic reed switch serially connected therebetween and this reed switch 70 may be termed an electromechanical proximity switch which may be actuated by merely bringing a magnet into close proximity with the switch 70. The switch 70 is normally open although it is to be understood that it may be also be normally closed. The switch 70 is embedded in the belt end member 60 in a position wherein it will be disposed closely adjacent a permanent magnet 72 which is embedded in a portion of the buckle 58 that is overlapped by the belt end member 60 when the latter is releasably and interlockingly engaged with the belt buckle 58.

The ends of the conductors 32 tand 36 remote from the ignition and neutral switches 30 and 38 are electrically connected to the terminals 68 of the junction box 34 and are therefore electrically connected with the conductor 64. The terminals 66 are electrically connected by means of a bridging member 76 and it may therefore be seen that the two switches 70 are serially connected in the solenoid actuating circuit defined by the conductors 28, 30, 36 and 42.

If it is desired, the conductors 62 and 64 may be encased in a ribbon-like plastic housing 78 secured to the undersurface of the corresponding belt section 56. In this manner, the conductors 62 and 64 will be insulated and this insulation will prevent the conductors 62 and 64 from being accidentally bridged by means of loose contact with the belt buckle 58.

It will be noted that the belt end member 60 overlaps the portion of the buckle 58 in which the magnet 72 is embedded and it will therefore be seen that it will be unlikely that accidental positioning of the belt end member 60 closely adjacent the belt buckle 58 will position the magnet 72 sufficiently close to the switch 70 for the latter to be actuated.

Finally, as previously set forth the switch 70 could be of the normally closed type and serially disposed within an electrical circuit other than the solenoid actuating circuit.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A seat belt control for vehicle ignition systems comprising first and second seat belt sections including one pair of corresponding base ends adapted to be fixedly secured in a vehicle and a second pair of corresponding free ends, the free end of said first belt section being provided with a first fixed end member and the free end of said second belt section being provided with a second end member adjustable longitudinally therealong, said end members being releasably and interlockingly engageable with each other, a pair of insulated conductors carried by one of said belt sections and extending longitudinally thereof, the pair of ends of said conductors adjacent the free end of said one belt section terminating on said first end member and being electrically connected by means of an enclosed normally open electromechanical proximity switch carried by said first end member, the other pair of ends of said conductors being adapted to be serially connected in an electrical control circuit of the vehicle in which said seat belt control is disposed, and a permanent magnet carried by the end member on said second belt section and positioned thereon, relative to said switch when said end members are secured together, closely adjacent said switch for actuation thereof by said magnet.

2. The combination of claim 1 wherein said releasably engageable end members, when engaged with each other, include closely adjacent overlapped portions which carry said magnet and said switch.

3. The combination of claim 1 wherein said control circuit comprises a starter actuating circuit whereby the engine of said vehicle may not be started until said end members are releasably engaged with each other.

References Cited in the file of this patent
UNITED STATES PATENTS

| | | |
|---|---|---|
| 1,958,482 | Leins | May 15, 1934 |
| 2,322,851 | Kalb | June 29, 1943 |
| 2,802,073 | Simon | Aug. 6, 1957 |
| 2,868,309 | Burgess | Jan. 13, 1959 |
| 2,996,587 | McCarthy | Aug. 15, 1961 |